June 10, 1958 A. STAVRAKIS ET AL 2,838,250

WEB DRIVE MECHANISM

Filed Oct. 20, 1954 2 Sheets-Sheet 1

INVENTORS
Alexander Stavrakis
& Charles J. Kennedy
BY Morris [signature]
ATTORNEY INVENTORS
Alexander Stavrakis
& Charles J. Kennedy
BY Morris [signature]
ATTORNEY United States Patent Office 2,838,250

Patented June 10, 1958

2,838,250

WEB DRIVE MECHANISM

Alexander Stavrakis, Upper Darby, Pa., and Charles J. Kennedy, Haddonfield, N. J., assignors to Radio Corporation of America, a corporation of Delaware Application October 20, 1954, Serial No. 463,502

5 Claims. (Cl. 242—55.12)

This invention relates to web driving mechanism, and more particularly to means selectively operable for applying a driving force to a web in one direction or drag bias when the web is being advanced in the opposite direction.

In the web reeling art, there are occasions when a web being reeled must be reeled selectively in either direction. An instance of such a reeling system is in the art of magnetic recording wherein data is stored in the form of discrete pulses on a magnetic record tape. The data stored on the tape is to be utilized in an automatic computing apparatus. In such systems, magnetic record tape may be primarily stored upon a pair of reels. Means are provided for driving the tape from one reel to the other past a transducer station. However, in order to accommodate rapid starts and stops of the tape without overcoming the inertia of the reels, intermediate storage bins are provided for storing soft loops of tape. The tape must be drawn from one reel and fed into an associated bin while the other reel is withdrawing tape from its associated bin. In order to provide a positive drive system for removing the tape from the one reel, means must be provided, apart from driving the reel, for withdrawing the tape from the reel. To attempt to remove tape from the reel and feed it into the bin by driving the reel in the unwind direction would cause a loosening of the several layers of tape on that reel without necessarily providing for the feeding of the tape into the associated bin.

Accordingly, it is an object of the present invention to provide improved tape drive means for drawing a quantity of tape from a reel to feed the tape into an intermediate storage bin.

It is another object of this invention to provide improved tape drive means as set forth above wherein the drive means is automatically disengageable upon reversal in the direction of reeling of the tape.

When the tape is being withdrawn from one of the bins and being wound onto an associated reel, back tension must be applied to the tape in order that the tape may be firmly and uniformly wound onto the take-up reel.

It is, therefore, a further object of the present invention to provide means responsive to the direction of reeling of the tape to apply drag tension to the tape prior to its being wound onto a take-up reel.

It is still another object of this invention to provide an improved tape drive mechanism which is responsive to the direction of reeling of the tape to selectively apply driving force to the tape upon the tape being reeled in one direction and to apply drag tension to the tape upon the tape being driven in the opposite direction.

In accomplishing these and other objects, there has been provided, in accordance with the present invention, an overdriven capstan and a pivotally mounted pinch roller. The capstan and the pivotal mounting for the pinch roller are both driven through friction slip clutches by a common belt. When a storage reel is driven in a direction to have the tape withdrawn therefrom, a torque is applied to the pivotal mounting of the pinch roller forcing the pinch roller into engagement with the conjointly driven capstan, pinching the tape therebetween and withdrawing same from the storage reel. An arm extending in the opposite direction from the pivotal axis of the pinch roller mounting means carries a resilient pressure pad. When the storage reel is driven in a direction opposite from that required to withdraw tape therefrom, an oppositely directed torque is applied to the pivotal mounting means. This oppositely directed torque disengages the pinch roller from the capstan and causes the pressure pad to engage the tape as it passes over a stationary guide member to apply a drag tension to the tape being wound onto a driven take-up reel.

A better understanding of this invention may be had from the following detailed description when considered in connection with the accompanying drawing which:

Figure 4:
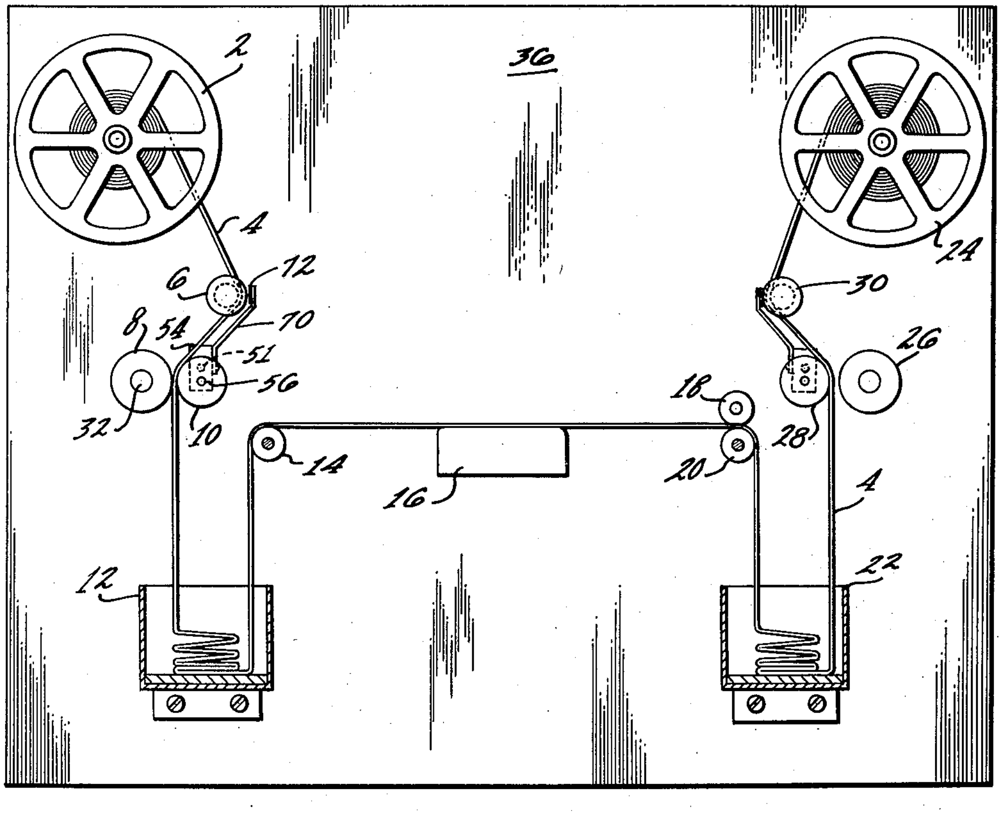
Fig. 4 is a schematic representation on a smaller scale of a tape reeling system embodying the present invention.

Referring now to the drawing in more detail, the overall system shown in Fig. 4 will be discussed first. A first or storage reel 2 is provided for a tape record member 4 which is fed over a guide member 6 between a capstan 8 and a pinch roller 10 into a first intermediate bin 12. From the intermediate bin 12, the tape is drawn over a guide member 14 past a transducer stage 16 by a capstan 18 and pinch roller 20. The tape is then fed into a second intermediate bin 22. A second or take-up reel 24 is driven by suitable means (not shown) to withdraw the tape 4 from the second intermediate bin 22. In its passage from the bin 22 to the take-up reel 24, the tape 4 passes between another capstan 26 and pinch roller 28, and around another guide member 30. The capstan 18 and pinch roller 20 are operable in response to signal demands controlled by other portions of the computer system. This capstan and pinch roller are provided with means for rapidly starting and stopping the tape 4 in its passage over the transducer stage 16.

The intermediate bins 12 and 22 each store a soft loop of tape which serves to isolate the motion of the tape 4 in the area of the transducer stage 16 from the motion of the tape 4 on the respective reels 2 and 24. Thus in rapid start and stop operation, the tape 4 at the transducer stage 16, is able to accelerate or decelerate independent of the inertia of the two reels 2 and 24.

The capstan 8 and pinch roller 10 are employed to control the operation of the tape 4 and its passage between the first or storage reel 2 and the first intermediate bin 12. Similarly, the capstan 26 and pinch roller 28 control the operation of the tape in its passage from the second or take-up reel 24 to the second or intermediate bin 22.

Figure 1:
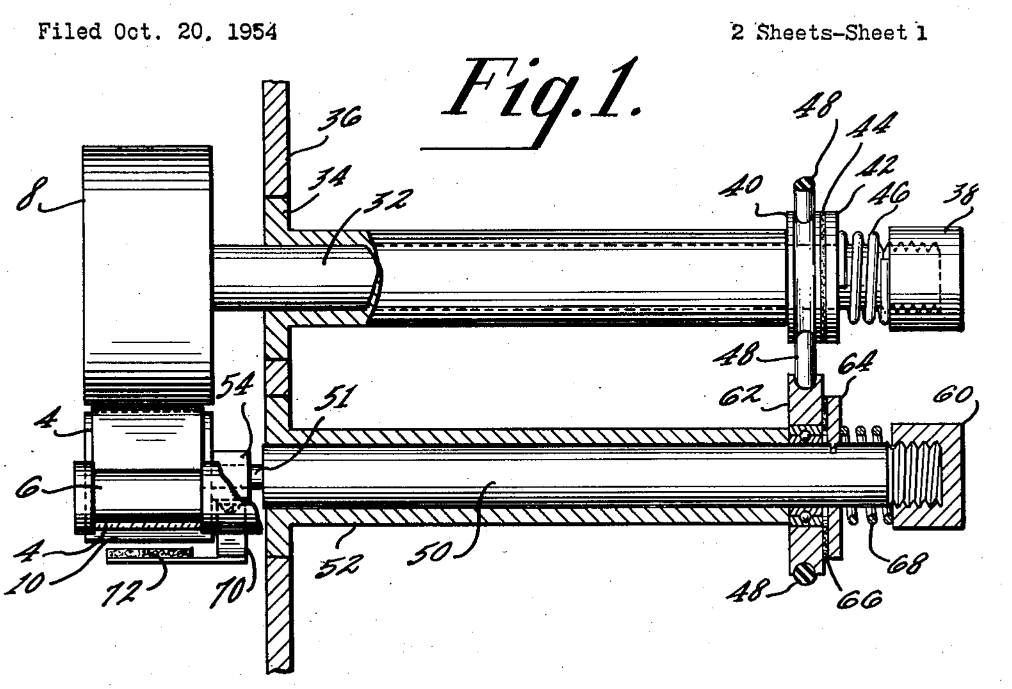
Fig. 1 is a top plan view partially in cross-section, partly broken away, of a portion of a reeling system embodying the present invention.
Figure 2:
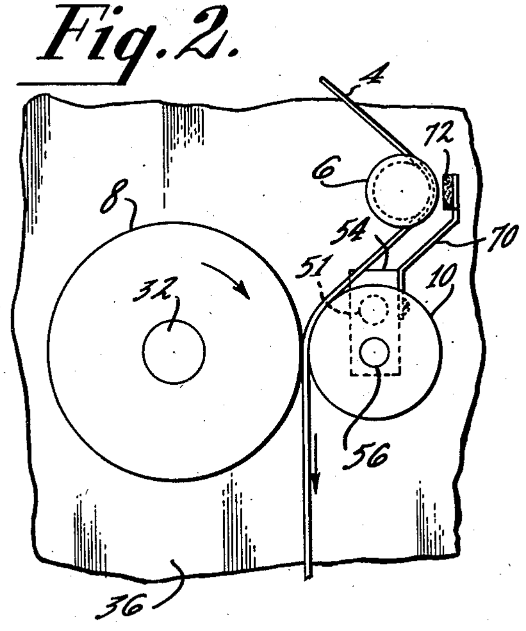
Fig. 2 is a front elevational view of the apparatus as shown in Fig. 1 and conditioned for withdrawing tape from a storage reel.
Figure 3:
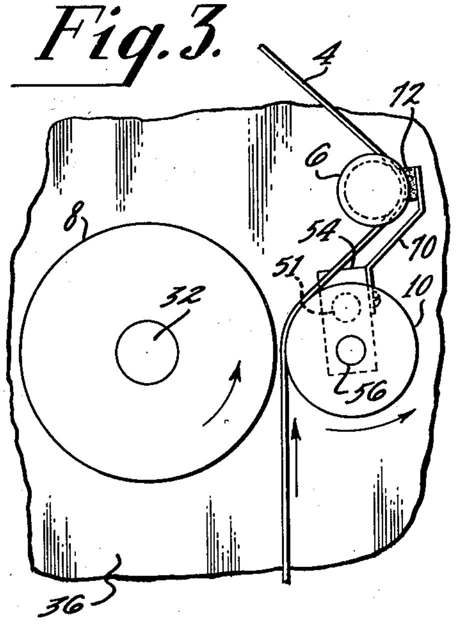
Fig. 3 is a view similar to that of Fig. 2 but showing the apparatus conditioned to apply a drag tension to a tape being wound onto a take-up reel.

The structure of the mechanism involving in these two capstans and their associated pinch roller are substantially identical with the exception that they are mirror images of each other. Accordingly, the description of one will suffice as a description of both. In Figs. 1 to 3, there is shown on an enlarged scale the mechanism comprising the capstan 8 and the pinch roller 10 and their associated elements. The capstan 8 is mounted on a shaft 32 which extends in a suitable bearing 34 through a mounting panel 36. The end of the shaft 32 opposite from the capstan 10 carries a collar 38. Near this collar, there is supported a free running pulley 40. The pulley 40 is adapted to be driven independently of the shaft 32. A clutch plate member 42 carries a friction facing of suitable resilient material such, for example, as felt 44 and is keyed to the shaft 32 for rotation therewith. A compression spring 46 surrounds the shaft 32 between the collar 38 and the clutch plate 42. This spring urges the clutch plate through its felt facing into engagement with the side of the free running pulley 40. The pulley 40 is driven by a belt 48 which is coupled to the reel driving means. The rotational energy applied to the pulley is transferred through the clutch member 42 to the shaft 32.

A second shaft 50 is mounted in spaced parallel relation with the shaft 32 in a suitable bearing 52 which extends through the mounting panel 36. The forward end 51 of the shaft 50, that is, the end adjacent the capstan, carries a block 54. The block 54 carries a second shaft 56 in spaced parallel relation to the shaft 50. On this second shaft 56, there is mounted a pinch roller 10. The positioning of the pinch roller on the block makes the rotational axis of the pinch roller eccentric with respect to the rotational axis of the shaft 50. Thus a rotation of the shaft 50 will cause the pinch roller 10 to be moved toward or away from the capstan 8 depending upon the direction of the rotation of the shaft 50. The end of the shaft 50 remote from the pinch roller carries a collar 60 similar to the collar 38 carried by the shaft 32. A free running pulley 62 is mounted on the shaft 50 and is driven by the same belt 48 as the pulley 40 mounted on the shaft 32. A clutch plate member 64 keyed to the shaft 50 and carrying a friction facing 66 of felt, for example, is biased to engagement with the side of the pulley 62 by a compression spring 68. The arrangement of the two pulleys 40 and 62 driven by the same belt 48 provides that the two pulleys will be simultaneously rotated in the same direction whenever the associated reel is driven. Thus a clockwise rotation of the pulleys results in a clockwise rotation of the capstan and in a limited clockwise rotation of the shaft 50. This clockwise rotation of the shaft 50 urges the pinch roller 10 into engagement with the capstan, as shown in Fig. 2, to press the tape 4 intimately against the capstan into driving relation therewith. Thus the tape 4 pinched between the capstan and the pinch roller 10 is pulled from the reel 2 and directed into the first intermediate bin 12. This provides a positive drive relationship in strippng or removng the tape 4 from the reel 2 and feeding the same into the bin 12.

The block 54 carries a resilient arm 70 which extends generally oppositely from the direction of the shaft 56. This resilient arm carries a pressure pad of resilient friction material such as felt 72. When the pulleys 40 and 62 are driven in a counterclockwise direction by the belt 48, the capstan is similarly driven in a counterclockwise direction. The shaft 50 is moved through a limited pivotal movement in a counterclockwise direction, as shown in Fig. 3, disengaging the pinch roller 10 from the capstan 8. However, the counterclockwise rotation of the shaft 50 causes the pressure pad 72 carried by the arm 70 to move into engagement with the guide member 6. As shown in Fig. 3, when a tape is being withdrawn from the bin and passes between the pressure pad 72 and the guide member 6, the pressure pad 72, in cooperation with the fixed guide member 6, exerts a drag tension on the tape 4 so that the tape 4 being wound onto the reel 8 by rotation of that reel will be wound onto the reel uniformly and firmly. When the apparatus is conditioned for withdrawing tape from the reel as shown in Fig. 2, the pressure pad member is disengaged from the tape and the guide member allowing the reel itself to supply any necessary drag tension to keep the tape taut between the reel 2 and the capstan 8. As previously noted, however, the capstan is overdriven, that is the pulley is driven at a speed greater than is necessary to withdraw the tape from the reel at its maximum velocity. The drag imparted to the reel by its associated motor (not shown) introduces a slip motion in the relation between the pulley 40 and the clutch plate 42. In this way, the necessary tension is maintained in the tape 4.

Thus it will be seen that there has been provided an improved tape drive mechanism which is responsive to the direction of the reel of the tape to selectively apply driving force to the tape upon the tape being reeled in one direction and to apply drag tension to the tape upon the tape being driven in the opposite direction.

What is claimed is:

1. A web driving mechanism comprising, in combination, reversible means for driving a web selectively in opposite directions, a storage reel for said web, means operative in response to operation of said driving means in one direction to withdraw said web from said reel, and web engaging means relatively movable in response to operation of said driving means in the opposite direction for engaging said web to apply drag tension to said web being wound onto said reel.

2. A web driving mechanism comprising, in combination, reversible means for driving a web member selectively in opposite directions, a storage reel for said web member, a capstan, a fixed guide member, a pressure member positioned adjacent to said fixed guide member, said web member being led in a path adjacent to said capstan and between said guide member and said pressure member, and means responsive to the direction of operation of said driving means to effect engagement of said web by said capstan upon operation of said driving means in one direction whereby to withdraw said web from said storage reel and to move said pressure member toward said guide member upon operation of said driving means in the opposite direction whereby to press said web between said pressure member and said guide member to exert a drag tension on said web being wound onto said reel.

3. A web driving mechanism comprising in combination, reversible means for driving a web member selectively in opposite directions, a capstan, a pinch roller positioned adjacent to said capstan, pivotal support means for said pinch roller supporting said roller for motion toward or away from said capstan, a fixed guide member positioned adjacent to said pivotal support means, a pressure member carried by said pivotal support means for movement toward or away from said guide member alternately with respect to the motion of said roller toward and away from said capstan, and means responsive to the direction of operation of said reversible drive means for effecting movement of said pivotal support means whereby said pinch roller is moved to engage said capstan during operation of said drive means in one direction and said pressure member is moved to engage said guide member during operation of said drive means in an opposite direction.

4. A web driving mechanism comprising, in combination, reversible drive means for driving a web member selectively in opposite directions, a capstan, a pinch roller positioned adjacent to said capstan, pivotal support means for said pinch roller supporting said pinch roller for motion toward or away from said capstan, a fixed guide member positioned adjacent to said pivotal support means, a pressure member carried by said support means for movement toward or away from said guide member alternately with respect to the motion of said pinch roller toward and away from said capstan, and friction coupling means coupling said pivotal support means to said reversible drive means for pivoting said pivotal support means to move said pinch roller into engagement with said capstan upon operation of said drive means in one direction and to move said pressure means into engagement with said guide member upon operation of said drive means in the opposite direction.

5. In a web reeling system including a reel for carrying said web and means for driving said reel for rotation with said web in opposite directions for the winding of said web on said reel and for the withdrawal of said web from said reel, the combination comprising a web driving member adapted to apply driving forces to said web on engagement therewith for withdrawing said web from said reel, web engaging means including a web contacting member relatively movable with respect to said web driving member for engaging said web therebetween for withdrawing said web from said reel, said web engaging means also including another member for applying drag tension to said web while said web is being wound on said reel, said other member being movable with said contacting member in an opposite direction thereto with respect to said web, and means driven by said reel driving means for moving said web engaging means.

References Cited in the file of this patent

UNITED STATES PATENTS

| | | |
|---|---|---|
| 1,831,562 | Heisler | Nov. 10, 1931 |
| 2,157,393 | Black | May 9, 1939 |
| 2,555,643 | Harrison | June 5, 1951 |
| 2,586,600 | Bartelson | Feb. 19, 1952 |
| 2,675,973 | Reed | Apr. 20, 1954 |
| 2,678,820 | Masterson | May 18, 1954 |
| 2,687,884 | Ward et al. | Aug. 31, 1954 |